L. BAGI.
AUTOMOBILE THEFT SIGNAL.
APPLICATION FILED JULY 19, 1919.
1,332,097.
Patented Feb. 24, 1920.
2 SHEETS—SHEET 1.
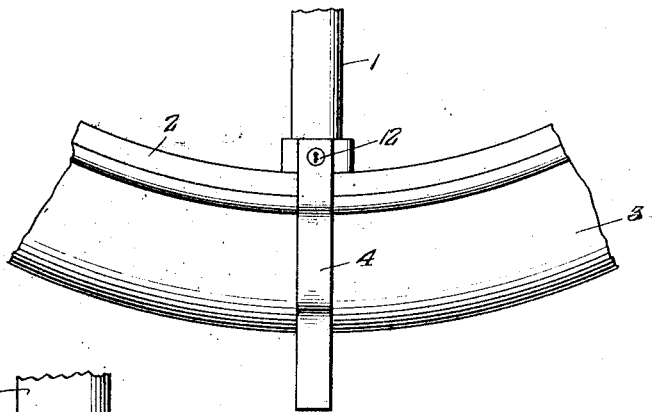
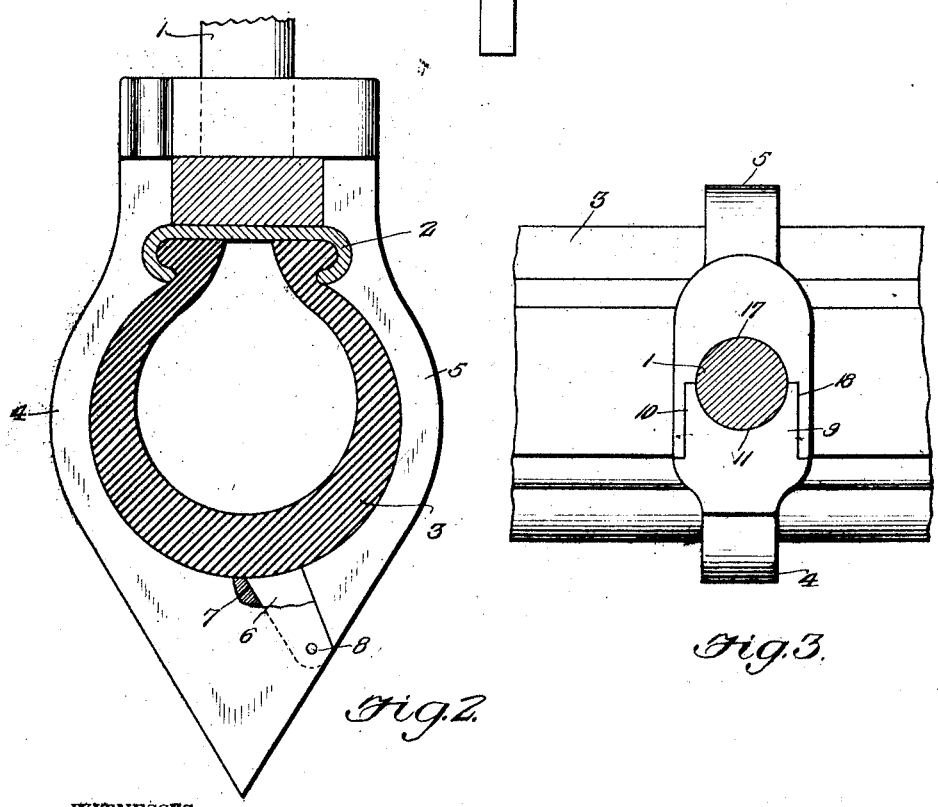
WITNESSES
INVENTOR.
BY Louis Bagi,
ATTORNEY.

L. BAGI.
AUTOMOBILE THEFT SIGNAL.
APPLICATION FILED JULY 19, 1919.

1,332,097.

Patented Feb. 24, 1920.
2 SHEETS—SHEET 2.

WITNESSES
J H Crawford

INVENTOR.
BY Louis Bagi,
Victor J. Evans
ATTORNEY.

UNITED STATES PATENT OFFICE.

LOUIS BAGI, OF GRANITE CITY, ILLINOIS.

AUTOMOBILE THEFT-SIGNAL.

1,332,097.　　　Specification of Letters Patent.　　Patented Feb. 24, 1920.

Application filed July 19, 1919. Serial No. 311,982.

*To all whom it may concern:*

Be it known that I, LOUIS BAGI, a citizen of Hungary, Europe, residing at Granite City, in the county of Madison and State of Illinois, have invented new and useful Improvements in Automobile Theft-Signals, of which the following is a specification.

The object of my present invention is to improve the kind of automobile theft signals that are applied to wheels of an automobile by providing a theft signal constructed and arranged to be securely locked not only on the wheel rim and tire, but also to the spoke or spokes and in alinement with the latter, so that the position of the signal cannot be changed when a tire is deflated, and so that the signal will rest in its efficient interfering position in alinement with the spoke or spokes until it is unlocked and removed from the wheel.

To the attainment of the foregoing, the invention consists in the peculiar and advantageous automobile theft signal, hereinafter described and definitely claimed.

In the accompanying drawings, hereby made a part hereof:

Figure 1 is a side elevation illustrative of a portion of an automobile wheel equipped with my novel theft signal.

Fig. 2 is an enlarged cross-section at right angles to Fig. 1.

Fig. 3 is a horizontal section through a spoke in a plane above the signal.

Similar numerals designate corresponding parts in Figs. 1 to 4, to which reference will first be had.

In Figs. 1 to 3 the wheel is shown as provided with the usual wooden spoke 1, rim 2 and inflatable tire 3.

Figure 4:
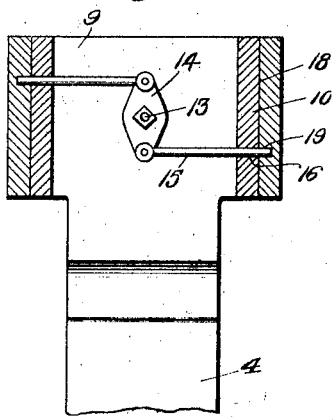
Fig. 4 is a detail view showing the bolts complementary to the lock.

As will be readily understood by comparison of Figs. 1, 2 and 3, my novel theft signal comprises a lock-carrying member 4 and a complementary member 5; the said member 5 being provided at one end with a tongue 6 that is let into a bifurcation 7 in the outer end portion of the member 4 and is pivotally and permanently connected to the said member 4 through the medium of a transverse pintle 8. Interiorly the members 4 and 5 are shaped to snugly receive and fit the tire and the rim, as well as the adjacent wooden spoke of the wheel. It will also be observed that adjacent to its inner end the member 4 is provided with a lateral inwardly-directed portion 9 that is reduced at 10 and is provided in its face with a groove 11 that extends lengthwise of the signal, and is of semi-circular form in cross-section so as to snugly straddle one side of the adjacent spoke 1. In the said member 4 and adjacent to the inner end thereof is permanently carried a cylinder lock 12 which extends inwardly at right angles to the outer edge of the said member 4. The said cylinder lock is preferably of the ordinary well known construction, with the exception that the inner end of its rotary member 13 is equipped with a lever plate 14, Fig. 4. To the said plate 14 are connected reversely arranged bolts 15 that are designed to be worked endwise through apertures 16 in the opposite walls of the groove 11.

The inner end portion of the member 5 is provided adjacent to its inner end with a groove 17 that extends in the direction of the length of the signal, and is adapted to snugly receive and straddle the other half circle of the spoke. The side walls of the said groove 17 are extended laterally inward from the end portion of the member 5, and are recessed as indicated by 18 to snugly receive the reduced portion 10 of the extension 9 on the member 4. In the inner sides of the side walls of the recess 18, sockets 19, which are closed at their outer ends, are provided for the reception of the bolts 15. Manifestly when the bolts 15 are seated in the sockets 19, it will be impossible to withdraw the lateral extension 9 of the member 4 from the recess 18 in the lateral extension of the member 5; and it will also be manifest that with the members 4 and 5 fixed with respect to each other in the relation shown in Fig. 1 to the tire, the rim and one spoke of the wheel, it is impossible to turn the theft signal out of alinement with the spoke referred to. On the other hand the theft signal will be strongly retained in alinement with the spoke referred to and with its outer end portion projecting radially a considerable distance beyond the tread of the tire so as to offer an efficient interference in the event that it is attempted to turn the wheel that is equipped with the signal. It will further be manifest that in the event of the tire being deflated, the signal will have the same interfering capacity as when the tire is in normal inflated condition.

To remove the theft signal from a wheel, it is simply necessary for the owner through the medium of the individual key-lock to manipulate the lock as so to withdraw the bolts 15 when the inner portions of the members 4 and 5 may be swung apart to enable said inner portions to clear the rim and the tire.

Figure 5:
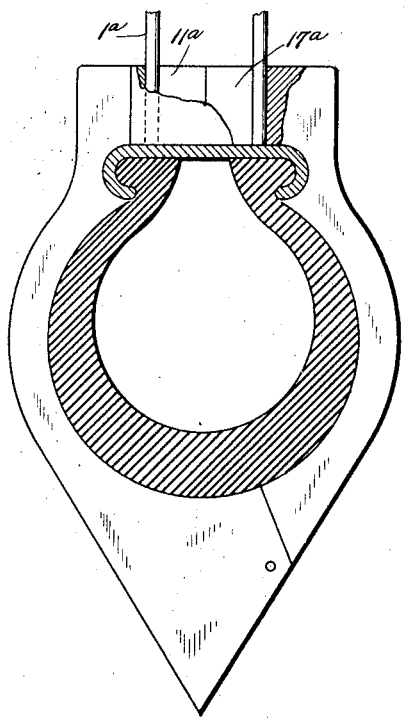
Fig. 5 is a view of a modification designed for use in conjunction with a wheel having wire spokes.
Figure 6:
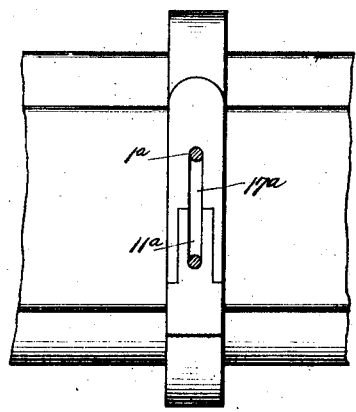
Fig. 6 is a section through the wire spokes in a plane above the signal.

In the modified construction shown in Figs. 5 and 6, which embodiment is designed for use in conjunction with a wheel having wire spokes 1ª, the groove 17ª in one member, and the groove in the complementary member are made long and thin, in order to snugly receive in their inner ends the said wire spokes 1ª, as shown. In other respects the modified type of theft signal is similar to the type shown in Figs. 1 to 4.

Having described my invention, what I claim and desire to secure by Letters-Patent, is:

1. A theft signal for use on vehicle wheels, comprising members hingedly connected together and adapted to encompass a tire, a rim and a spoke and to project radially from the tire; one of the said members having a groove in its inner side at its inner end, and a lateral extension in which is a recess in communication with said groove, and the other member having a groove in its inner side opposite the first-named groove and a reduced portion adapted to snugly occupy the recess in the first-named member, a lock carried by the inner end portion of the second-named member and oppositely movable bolts operable and controlled through the medium of the said lock and adapted when thrust outwardly to be socketed in the inner sides of the side walls of the recess in the first-named member.

2. A theft signal for use on vehicle wheels, comprising members hingedly connected together and adapted to encompass a tire, a rim and a spoke and to project radially from the tire; one of the said members having a groove in its inner side at its inner end and a lateral extension in which is a recess in communication with said groove, and the other member having a groove in its inner side opposite the first-named groove, and a reduced portion adapted to snugly occupy the recess in the first-named member, and locking members carried by one member and constructed and arranged to engage the other member.

In testimony whereof I affix my signature.

LOUIS BAGI.